Dec. 15, 1942.   A. HANSEN, JR   2,305,416
MAGNETIC SUSPENSION
Filed Nov. 19, 1941
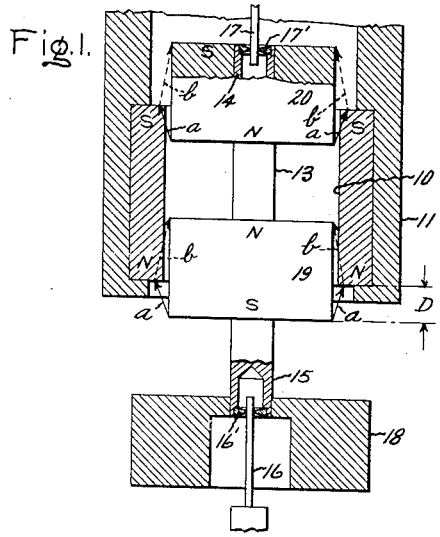
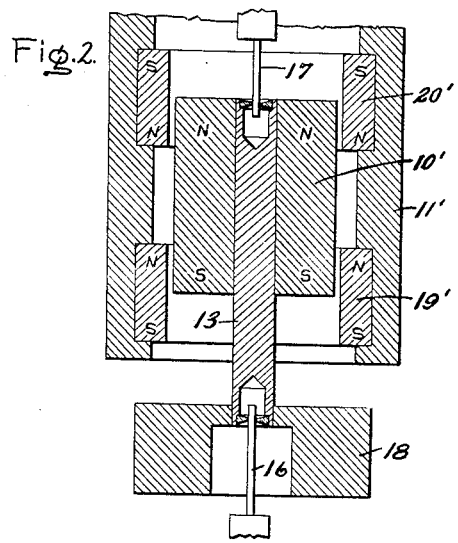
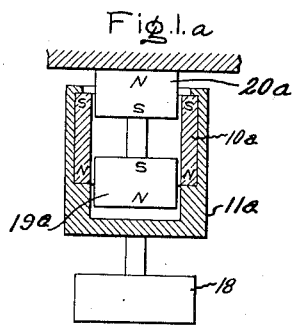
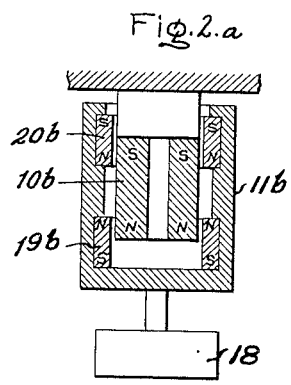
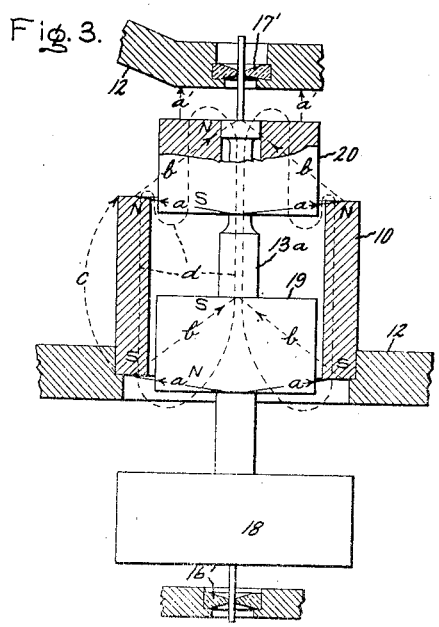
Inventor:
Albert Hansen Jr,
by Harry E. Dunham
His Attorney.

Patented Dec. 15, 1942

2,305,416

UNITED STATES PATENT OFFICE 2,305,416

MAGNETIC SUSPENSION

Albert Hansen, Jr., Nahant, Mass., assignor to General Electric Company, a corporation of New York Application November 19, 1941, Serial No. 419,738

8 Claims. (Cl. 308—1)

My invention relates to magnetic suspensions suitable for supporting the weight of rotary bodies where the axis of rotation is vertical. The magnetic suspension herein described is an improvement over the magnetic suspension described and claimed in my copending application, Serial No. 359,732, filed October 4, 1940.

Important objects of the present invention are to greatly increase the efficiency of the magnetic material employed in the suspension and to reduce the amount of vertical displacement of the suspended part relative to the stationary part of the suspension when subjected to a given load variation.

The features of my invention which are believed to be novel and patentable will be pointed out in the claims appended hereto. For a better understanding of my invention, reference is made in the following description to the accompanying drawing in which Fig. 1 represents a side view partially in section of a magnetic suspension embodying my invention employing a pair of inner permanent magnets in telescoping cooperative relation with an outer permanent magnet, and Fig. 2 represents a modification where double outer magnets cooperate with a single inner magnet. In each of such modifications there are double repulsion and attraction magnetic supporting forces operating through relatively short air gap spaces. Figs. 1a and 2a show modified construction so that the inner magnet assemblies are fixed and the outer magnet assembly supports the load; and Fig. 3 represents a modification of Fig. 1 having reduced leakage fluxes.

Referring to the drawing, Fig. 1, 10 represents a stationary hollow cylindrical permanent magnet and 11 any suitable non-magnetic support therefor, the magnet being supported so that its axis is vertical and magnetized so that its magnetic axis is vertical. The stationary magnet and its support are shown in section through a diameter of the magnet. 13 represents a vertical rotary shaft with end portions 14 and 15 forming guide bearings with stationary pins represented at 16 and 17. These guide bearings are for maintaining the shaft 13 centered on the axis of the stationary magnet 10. The pins 16 and 17 may be so reduced in size as to be resilient and thus afford a desirable amount of flexibility with respect to sidewise forces on the shaft. The bearing parts 16' and 17' are not intended to support any part of the weight of the shaft or parts carried thereby. The shaft supports any suitable rotating element which may be represented as a cylindrical weight 18 and a pair of cylindrical permanent magnets 19 and 20 concentric with and cooperating with stationary magnet 10 in telescoping relation to magnetically support the weight of the vertical shaft and all parts carried thereby. The magnets 19 and 20 secured to shaft 13 have an outside diameter slightly less than the inside diameter of magnet 10. Each has a length approximately one-half the length of magnet 10. Magnet 19, located adjacent and cooperating with the lower end of stationary magnet 10, is polarized along its vertical axis so that its lower end is below and attracts and its upper end is above and opposes the lower pole of the stationary magnet 10. The designations N and S indicate the relation in which the magnets are polarized.

The upper rotary magnet 20, located adjacent and cooperating with the upper pole of stationary magnet 10, is polarized along its vertical axis so that its lower pole is below and attracts and its upper pole is above and repels the upper pole of stationary magnet 10. Thus the upper rotary magnet 20 is polarized in the same direction as, and the lower rotary magnet 19 is polarized in the opposite direction to, the stationary magnet 10. The two rotary magnets are spaced apart along shaft 13 approximately the distance corresponding to the length of the stationary magnet. Thus the distance between the bottom ends of the magnets 19 and 20 corresponds to the length of magnet 10 or approximately so.

As thus arranged, it is apparent that all of the magnetic forces acting between the stationary and rotary magnet systems are in a direction to lift or support the weight of the rotary assembly. The main attraction forces are represented by full line arrows $a$ and the repulsion forces are represented by dotted line arrows $b$, the direction of the arrow heads representing the direction of the force in supporting the weight of the rotating element or assembly.

This magnetic suspension, I find, is more efficient than the single element suspension which was the subject matter of my prior application, S. N. 359,732. Due to a more efficient utilization of available magnetic flux and the use of more working poles on the permanent magnets, less magnetic material need be employed to carry a given load. In Fig. 1, I have shown the working poles by arrows and their direction of load support as indicated by such arrows. There is one more working pole than in the suspension of my prior application. Another advantage of my multiple element suspension is that it deflects exactly one-half as much as the suspension of my prior application to carry maximum load. By this I mean that the suspended element moves downward a distance D, Fig. 1, when load is applied, the distance D being termed the deflection. I find that when the magnets 19 and 20, Fig. 1, are carrying maximum load, they deflect a distance equal to one-half the length of one of the single magnets, whereas in my prior suspension maximum load was suspended when the relatively longer inner magnet was deflected by one-half its length. The deflection represented in Fig. 1 is for less than maximum loading.

Using permanent magnets made of copper, nickel, cobalt and proportioned as shown in Fig. 1, I have used a magnet 10 having a length .685", outside diameter .9335", inside diameter .6875", and weight 29.5 gr. with two similar magnets 19 and 20 each of a length .3425", outside diameter .650", inside diameter .219", and weight 23.9 gr. The adjacent ends of magnets 19 and 20 were spaced .3425". Such a suspension will support a total weight of 150 grams with a maximum displacement D of .1712".

Another important feature of this suspension is that the flux lines are largely self-closing and it has little magnetic influence on adjacent elements and is not easily influenced by the close proximity of other electro-magnetic or magnetic elements. It may, therefore, be placed quite close to such other elements without the necessity of elaborate shielding.

In the construction of Fig. 1 the upper magnetic pole of upper moving magnet 20 is somewhat exposed with no short return path for its flux lines to an unlike magnetic pole of the suspension system. The reluctance is correspondingly high and the flux reduced. Such arrangement may be improved upon under certain conditions by one of two expedients illustrated in Fig. 3.

In Fig. 3 is shown a multiplicity of magnetic circuits which might be employed either singly or in combination to produce desirable effects in improving the efficiency of the magnetic suspension. For example, by the use of a highly permeable frame structure 12 between the lower end of the stationary permanent magnet and extending to a point above the upper rotary magnet some of the flux of the lower south pole of magnet 10 can be directed so as to link with the upper north pole of the magnet 20 through the frame, thus producing another attracting force as is indicated by the arrows $a'$, aiding the main poles of the suspension. Some of this flux would otherwise be wasted as leakage flux, as indicated by arrow $c$. Another feature that may be employed is illustrated in connection with the rotating part of the structure, Fig. 3, which is to use a highly permeable shaft section 13a between the upper north pole of magnet 20 and the upper south pole of magnet 19. The shaft section is undercut adjacent the south pole of magnet 20 so as not to magnetically short-circuit this magnet. Such arrangement creates a magnetic circuit which is closed except at the working air gaps, which may be traced as follows: from the upper north pole of magnet 20 through shaft section 13a to the south pole of magnet 19; from the north pole of magnet 19 to the south pole of magnet 10 to the north pole of magnet 10 and to the south pole of magnet 20. Such circuit is indicated by dotted lines $d$. This utilizes much of the flux that would otherwise be wasted as leakage flux and thus reinforces the main supporting poles. By suggesting the features shown in Fig. 3 I do not wish to imply that I consider the arrangement of Fig. 1 undesirably inefficient. When using either feature of Fig. 3 it may be desirable to make minor changes in the relative size and disposition of the magnets used.

The arrangement of Fig. 1 may, in effect, be turned inside out as illustrated in Fig. 2 where 19' and 20' are the stationary magnets of the two-magnet system and 11' their supporting structure. 10' is the magnet of the single magnet system which is magnetically suspended and is rotatable. The inner magnet system may be made the stationary system, as indicated in Figs. 1a and 2a, while retaining the beneficial results previously explained. In Fig. 1a, 19a and 20a represent the permanent magnets of the two-magnet system. These magnets are stationary and are inside the magnet 10a of the other system which is supported by and suspends the rotatable element 11a. In Fig. 2a, 19b and 20b represent the outer rotatable suspended magnets of the two-magnet system and 11b their supporting structure. 10b represents the magnet of the single magnet system which is the inner magnet and is stationary.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A magnetic suspension for vertical shafts comprising two relatively movable permanent magnet systems, one system comprising a single permanent magnet and the other system comprising two permanent magnets, the two permanent magnets of one system being axially spaced apart by approximately the axial length of one of them and each having an axial length of approximately one-half of the length of the single magnet of the other system, all of said magnets being of cylindrical shape with one system in spaced telescoping concentric relation with respect to the other and with their mechanical and polarized axes vertical, the magnets of the two magnet system being reversely polarized and one cooperating with the north pole and the other cooperating with the south pole of the magnet of the single magnet system.

2. A magnetic suspension comprising an outer magnetic system comprising a single permanent magnet of hollow cylindrical shape with its magnetic and mechanical axis vertical and an inner magnetic system comprising a pair of axially spaced similar permanent magnets of cylindrical shape of an outside diameter less than the inner diameter of the outer permanent magnet, the magnets of the inner system having their mechanical and magnetic axes vertical with the magnets reversely magnetized, said inner magnets having a length and axial spacing substantially equal to one-half the length of the magnet of the outer system and means for maintaining said systems in concentric relation while allowing one to move vertically with respect to the other.

3. A magnetic suspension comprising a stationary outer magnetic system and an inner movable magnetic system, one system comprising a cylindrical permanent magnet with its mechanical and magnet axis vertical, the other system comprising a pair of permanent magnets with their mechanical and magnetic axes vertical and with the magnets reversely polarized, the magnets of said pair having an axial length and being axially spaced apart approximately one-half the length of the magnet of the other system, said two systems being concentrically arranged with a spacing between them allowing freedom of relative axial and rotary movements with one magnet of the two-magnet system adjacent the north pole and the other magnet of the two-magnet system adjacent the south pole of the magnet of the single magnet system.

4. A magnetic suspension comprising a stationary magnet system having a cylindrical permanent magnet with its magnetic and mechanical axes vertical, and a movable magnetic system having a pair of cylindrical permanent magnets with their mechanical and magnetic axes vertical and with the pair of magnets similar but reversely magnetized, the magnets of said pair being axially spaced apart and of an axial length substantially equal to one-half of the length of the magnet of the stationary magnetic system, said two systems being concentrically arranged with the north and south poles of the magnet of the single magnet system adjacent the reversely magnetized magnets respectively of the two-magnet system.

5. A magnetic suspension comprising an inner cylindrical permanent magnet with its magnetic and mechanical axes vertical, an outer system cooperating therewith comprising a pair of hollow cylindrical permanent magnets with their mechanical and permanent magnetic axes vertical and concentric to the inner permanent magnet, said pair of hollow magnets being axially spaced a distance and being of a length substantially equal to one-half the length of the inner permanent magnet, said pair of permanent magnets being reversely polarized, one being located adjacent the north pole and the other being located adjacent the south pole of the inner permanent magnet, said inner permanent magnet and said outer system being relatively movable along and about their common axis.

6. A magnetic suspension comprising a stationary magnetic system having a pair of mechanically similar cylindrical permanent magnets and a rotatable magnet system comprising a single cylindrical permanent magnet of twice the axial length of one of the magnets of the stationary system, all of said magnets having a common vertical axis and all of said magnets being magnetized along vertical axes with the stationary magnets reversely polarized and spaced apart a distance substantially equal to one-half the length of the rotatable magnet, said two systems having their magnets in telescoping concentric relation with the stationary magnets opposite the different poles of the rotary magnet.

7. A magnetic suspension comprising an outer hollow cylindrical stationary permanent magnet having its mechanical and magnetic axes vertical, and a rotary magnetic system cooperating therewith comprising a pair of cylindrical permanent magnets having their mechanical and magnetic axes vertical and concentric with the axis of the stationary magnet and of a size to move freely within the outer magnet, said pair of rotary magnets being reversely polarized and being approximately one-half the length of, and axially spaced apart approximately the distance of, one-half the length of the stationary magnet, said rotary magnet system having an operating position where the upper rotary magnet extends above and the lower rotary magnet extends below respectively of the upper and lower ends of the stationary magnet, and supporting framework of magnetic material extending from the lower end of the stationary permanent magnet to a point above the upper end of the upper rotary magnet such that leakage flux from said magnetic suspension traverse the supporting framework and assists in the magnetic lifting action on the rotary system.

8. A magnetic suspension comprising an outer hollow cylindrical permanent magnet and a pair of inner cylindrical permanent magnets, the inner and outer magnets having their mechanical and magnetic axes vertical and concentric, the inner permanent magnets having a length and axial spacing of approximately one-half the length of the outer magnet, the inner magnets telescoping with and being relatively movable along and about their axis with respect to the outer magnet, said inner magnets being reversely polarized, and an axial magnetic connection between poles of unlike polarity thereof.

ALBERT HANSEN, Jr.